April 15, 1930.  J. A. CAMPBELL  1,754,606
STABILIZING ABSORPTION SYSTEM
Filed April 19, 1927  2 Sheets-Sheet 1
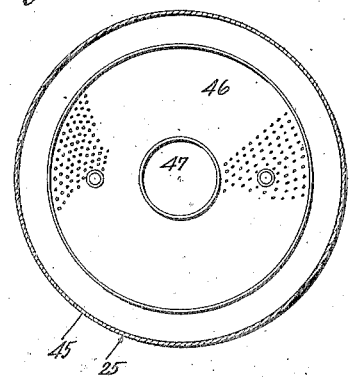
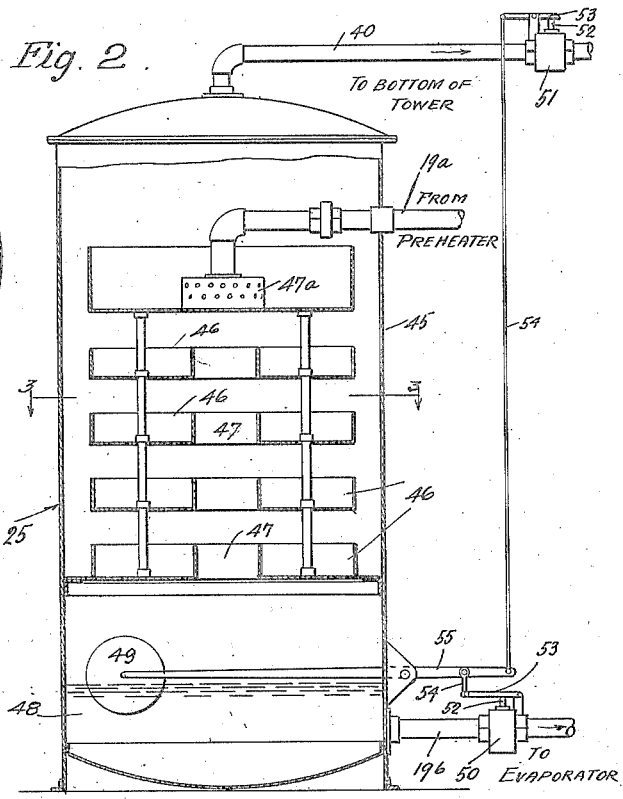
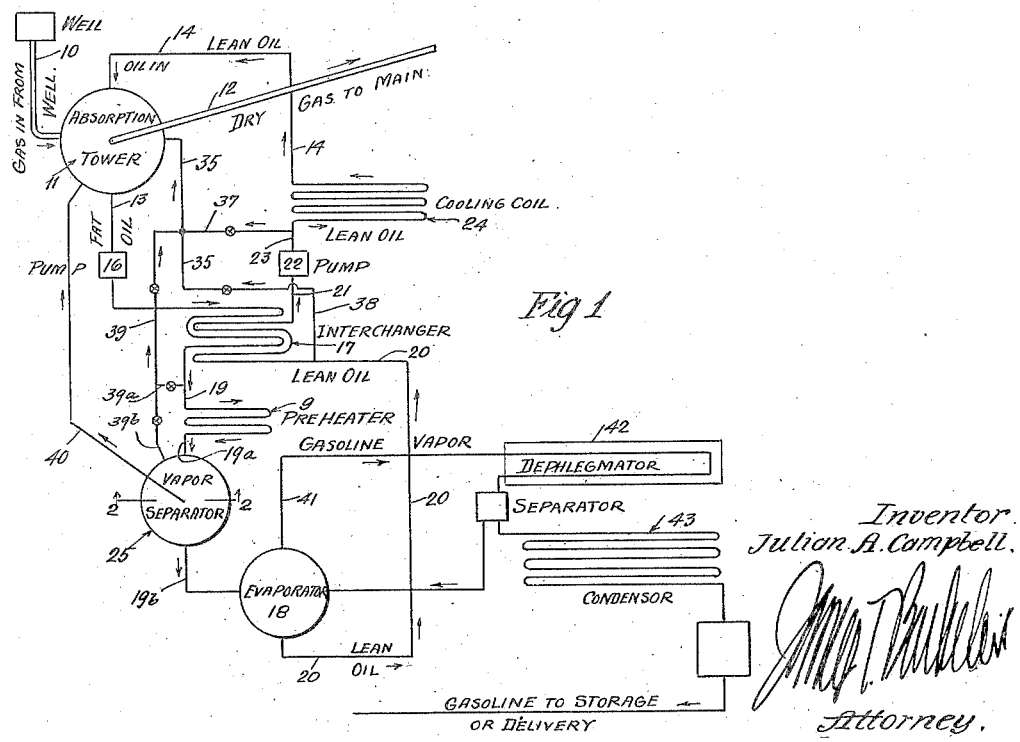
Inventor.
Julian A. Campbell.
Attorney.

April 15, 1930.                J. A. CAMPBELL                1,754,606
                         STABILIZING ABSORPTION SYSTEM
                         Filed April 19, 1927      2 Sheets-Sheet 2
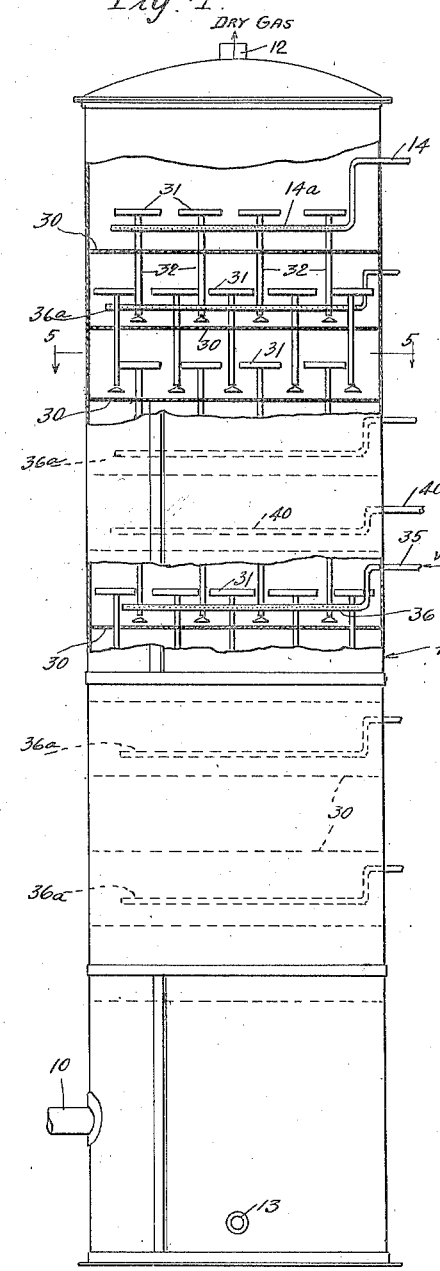
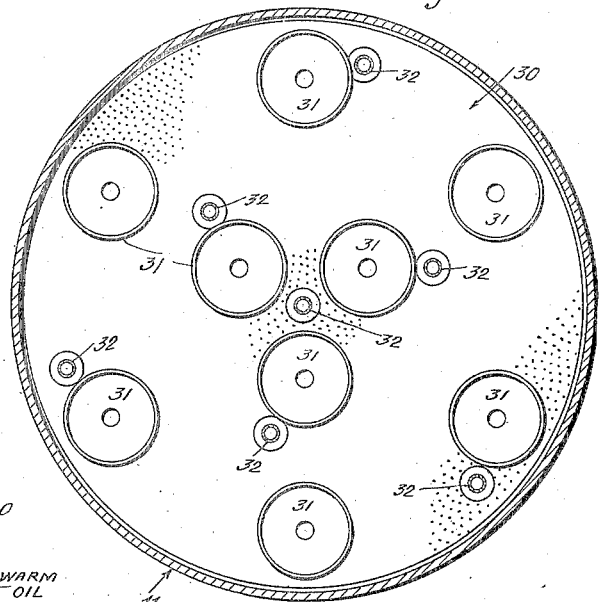
Inventor
Julian A. Campbell
Attorney.

Patented Apr. 15, 1930

1,754,606

UNITED STATES PATENT OFFICE

JULIAN A. CAMPBELL, OF LONG BEACH, CALIFORNIA

STABILIZING ABSORPTION SYSTEM

Application filed April 19, 1927. Serial No. 184,868.

This invention has to do primarily with the "stabilization" of gasoline—that is the removal from gasoline of undesirable and highly volatile constituents. Processes of stabilization are usually applied to gasoline obtained by absorption from casing head gas and the following specification will deal particularly with the invention as applied to such gasoline, although in its general nature the invention will be seen not to be limited to such specific use, but capable of use for the stabilization of any gasoline, or in fact of any admixture of components of different boiling points, containing elements having boiling points lower, or vapor tensions higher, than is desirable in the mixture.

The gasoline obtained from casing head gas, commonly by the absorption process, contains a fair proportion of very volatile constituents which are undesirable in commercial gasoline, the boiling point being very low and their vapor tension at ordinary temperatures being very high. In operating an absorption plant for a high percentage of recovery from natural gas it has been an inevitable concomitant that the absorption and recovery of these more volatile constituents has also been increased. Consequently, the resultant liquid has necessarily been subject to methods of stabilization to remove these most volatile constituents; and, without going into detail, I may say that such processes and the attendant mechanisms of stabilization have been more or less cumbersome and complicated and correspondingly expensive.

The general object of this invention is to provide in an absorption system a method and apparatus arrangement whereby the absorption system itself has incorporated within it means for eliminating the undesirable volatile constituents, so that these volatile constituents are ejected immediately in the process of absorption and do not have to be removed by subsequent operations, and so that the resultant absorption product is one that needs no further stabilizing. The results may be viewed as the effective combination of stabilizing and absorption operations and apparatus, or may be viewed as the combination, both as to method and apparatus, of an absorption system and a dephlegmator system. All of these and other objects and corresponding accomplishments will be best understood from the following specification wherein I explain what is now my preferred stabilizing absorption system, reference for that purpose being had to the accompanying drawings, in which:

Fig. 1 is a diagram illustrative of a complete system in accordance with my invention;

Fig. 2 is a detailed section of the vapor separator which may optionally be used in the system, that section being taken as indicated by line 2—2 on Fig. 1;

Fig. 3 is a horizontal section as indicated by line 3—3 on Fig. 2;

Fig. 4 is a vertical view, with parts in elevation, of a typical absorption tower which may be used in the system; and Fig. 5 is an enlarged horizontal section on line 5—5 of Fig. 4.

Describing the system in general and referring first to Fig. 1, the gas from the well, known as natural gas or casing head gas, passes through pipe 10 to the absorption tower 11. The general function of this absorption tower, as is well known, is to absorb the vapors from the casing head gas in a suitable absorbing medium, usually a fairly light petroleum product, leaving dry gas to pass out through the outlet pipe 12, the absorbent oil with its burden of absorbed constituents passing out as "fat oil" through pipe 13. The operation of the absorption system, aside from the absorption tower, is to separate the absorbed constituents from the fat oil and to pass the resultant "lean oil" back to the absorber, the lean oil entering the absorber through the pipe 14 and passing down through the absorber in counter current against the rising laden gas which enters the lower end of the absorber. Typically the fat oil passes from the absorber first to a pump 16 which first pumps the fat oil to a heat interchanger 17 where the oil is somewhat warmed by heat exchange with the lean oil coming from evaporator 18; thence through pipe 19 to a preheater 9 and thence, in the usual installation, directly to evaporator 18 where the fat oil is finally raised to a temperature sufficient to vaporize and drive off all of the absorbed hydrocarbon constituents, leaving the lean oil to pass out through pipe 20 to heat exchanger 17 and thence through pipe 21 to pump 22. From pump 22 the lean oil passes through pipe 23 to the cooling coil 24 where the temperature of the lean oil is reduced to the most efficient point, usually around 65° or 70° F. Thence the lean oil passes through pipe 14 to the absorption tower as before stated.

In my system, instead of passing the preheated fat oil directly from preheater 9 to evaporator 18 I may optionally pass it through a vapor separator 25 whose construction and operation will be hereinafter explained. In the broad aspects of my invention it is not necessary that such a vapor separator be used, although it may be desirable in some instances.

The absorption operation in such an absorption tower as shown in Fig. 4 is one dependent for its over-all efficiency upon various factors, such as the intimate contact of the vapor laden gas with the absorbing oil, and also the general temperature of operation during the absorption process. In such an absorber as shown in Fig. 4 (this absorber is explained only as typical and not as a limitation upon the invention) there are several perforated floors 30 and the lean absorbing oil, at a temperature of say 60° F., is delivered to the distribution pipe 14ª over the uppermost floor. The vapor laden gas introduced through pipe 10 to the lower end of the absorber is under a sufficient pressure to bubble up through the oil and through the perforated floors, while the oil flows down from floor to floor, thus establishing over each floor a layer or body of froth in which the vapor laden gas comes into intimate contact with the oil over a very large total area of contact. The froth over each floor builds up until it reaches the upper edges of pans 31, the froth breaking up at the edges of the pans, the clear oil with its burden of absorbed constituents flowing over the edges of the pans and into them and thence down through the standpipes 32 to points near the floor next below, to be again frothed there by the upwardly flowing gas. The absorbing oil thus passes down through the tower in successive stages while the gas bubbles up through the oil, the oil and gas coming into successive intimate contacts. The oil absorbs the absorbable vapors carried by the incoming gas, and the gas is correspondingly cleaned of those vapors, the percentage of absorption by the oil, and cleaning of the gas, depending upon the relative point, so to speak, at which absorption equilibrium is reached as between the vapor laden gas and the absorbing oil. Such absorption in practical operation of an absorption tower is not perfect, as it is impracticable to reduce the temperature of operation, or increase the pressure of operation, to the point where the vapor tension of the desirable constituents carried in the gas is substantially zero. But it is endeavored to keep the temperature and pressure in the absorption tower at such points that the percentage of absorption of the desirable constituents is made comparatively high, by maintaining conditions that lower the vapor tension of the desirable constituents, and those same conditions lower also the temporary vapor tension of the more volatile and undesirable constituents and they are also absorbed in higher percentage.

My method of accomplishing stabilization in conjunction with the absorption operation is based broadly upon the maintenance of a lower portion of the absorbing body at a temperature higher than that of the upper portion of the absorbing body; and within the broad concept of my invention this difference in temperature may be maintained in any suitable manner. For instance, as will readily be realized, the lower part of the absorbing oil body, stream or column, may be relatively heated in any suitable manner, as for instance, by steam coils or other well known means. The stabilizing operation depends fundamentally upon thus maintaining a difference in temperature between one part of the oil body and another part of the oil body, that part through which laden gases pass first being maintained at the higher temperature. And such differential of temperature may of course be obtained by relatively cooling the part of the body that is to be maintained at a lower temperature. However, I prefer, in absorption processes as now carried on, to relatively heat the lower part of the absorbing oil body or stream, and to do that by introducing warmer oil from some suitable place in the system, because that can be done easily and effectively without loss of heat.

I speak in a broad sense of a body of absorbing oil, although in the continuous processes of absorption as now practiced, that body is maintained as a flowing stream, moving downwardly through an absorption tower. However, it will be apparent from my description of operation that my stabilizing system is in general applicable to the older types of absorbing systems in which the body of absorbing oil may be handled as a batch and not necessarily pass continuously through a downwardly moving stream. But the continuous method is preferred. So, preferably I provide the typical stabilizing operations as will now be described.

At some suitable intermediate point in the absorption tower a pipe 35 is arranged to discharge through a distributor 36 over one of the floors. The exact point at which this distributor delivers warm oil into the absorption tower depends upon several factors, including the temperature of the warm oil thus delivered to the tower and also including the nature of the constituents present in the original gas and the nature of the desired final recovery. However, to give an idea of what may be a practical arrangement I may say that in the usual absorption system operated upon average gases to produce average gasoline, this warm oil introduction may take place about the middle of the absorption tower when the warm oil is at a temperature of about 130° F.; and lower down when the temperature of the warm oil is correspondingly higher. Either warm lean oil or warm fat oil may be thus introduced at an intermediate point in the absorber; and the diagram of Fig. 1 shows several arrangements which may be used alternatively or in combination, or any or all of which may be put into the plant so as to be used alternatively or in combination. For instance, I show a valve controlled pipe 37 leading from lean oil pipe 23 to the pipe 35. Also I show a valve controlled pipe 38 leading from lean oil pipe 20 to pipe 35; also a valve controlled pipe 39 leading to pipe 35 and having branches 39ª and 39ᵇ through which oil may be introduced either from the fat oil pipe 19 or from the vapor separator 25 (which typifies any point on the hot side of the preheater 9). If lean oil is introduced from pipe 23 just before the lean oil reaches cooling coil 24, that oil will be at a temperature of about 130° F., that being an average temperature at which the lean oil leaves the heat interchanger 17. If the lean oil is introduced through pipe 35 from pipe 20 it will then have a temperature of about 320° F. in an average case and its introduction to the absorption tower as previously mentioned will be somewhat lower down. If fat oil is introduced through pipes 39ª and 39ᵇ from a point between the heat interchanger 17 and preheater 9, it will have a temperature of about 230° F. in an average case; while from the vapor separator 25 through pipe 39ᵇ a fat oil will have an average temperature of about 320° F. I shall first explain the operation of the system as if lean oil were introduced say from pipe 23 and at an average temperature of about 130° F.

In the ordinary operation of the absorption tower as heretofore explained the absorbing oil in the upper part of the tower has taken on a certain percentage of the vaporous absorb, including a certain percentage of the most volatile and undesirable constituents and carries such percentages of all constituents by the time it reaches an intermediate point in the tower. In normal operation, from there on down through the tower, the absorbing oil absorbs more of all the constituents; but the comparative percentage absorption of the less volatile constituents is larger in the lower part of the tower while the comparative percentage absorption of the more volatile constituents is larger in the upper part of the tower. The absorbing oil therefore goes down to the intermediate part of the tower fairly well laden with the most volatile constituents, and it is there that this comparatively cool absorbing oil comes into contact and is admixed with hotter absorbing oil, and the whole body of oil from that point on down through the tower thus being substantially warmer than is the oil in the upper part of the tower. In a typical case a sufficient quantity of the hot oil may be run into the tower at the intermediate point to raise the temperature of the whole body of the oil below to about 100° F. This warmer lower body of absorbing oil is still capable of absorbing the less volatile and desirable constituents and continues so to do, although not in quite as high a percentage as would cooler oil under the same circumstances. But the circumstances are further altered in this lower warmer body of oil by the fact that the absorb of more volatile constituents in that warmer body is substantially wholly eliminated, as will be described, and this warmer body of oil, thus being freed of what would be its normal burden of most volatile constituents, again has its absorbing capacity for the less volatile constituents increased; so that the final absorbing efficiency of this lower body of warmed oil is at least not decreased, but may, as an actual matter of fact, be materially increased as compared with standard practices.

The temperature maintained in the lower warmer body of absorbing oil is high enough to vaporize the most volatile undesirable constituents and those vapors are released from the warmer oil and are carried upward in the stream of gas that bubbles up through the upper cooler body of oil. When a condition of equilibrium is established—when the upper cooler body of oil is loaded to its absorption capacity with these most volatile constituents, then these volatile constituents begin to pass out with the fixed gases at the upper end of the absorber. Thus in normal operation the absorber acts somewhat as does a dephlegmator, wherein a higher temperature is maintained below than above, and the tendency in the upper part is toward condensation while the tendency in the lower part is toward vaporization. That is also true in my stabilizing absorption system. The lightest undesirable constituents are being continuously vaporized in the lower part of the absorbing oil; and any desirable lower boiling point constituents which may be carried up along with the lighter vapors are being continuously recondensed and reabsorbed in the upper cooler body of oil, the operation being uniform and continuous after a condition of equilibrium has been reached. Operating in that condition of equilibrium, substantially no constituents of a boiling point lower than the temperature of the lower body of absorbing oil pass out with the absorbing oil through the final fat oil outlet. By proper selection of relative oil temperatures to suit any given set of conditions, the final absorption product can be kept substantially clean of the lightest and undesirable constituents, while at the same time the absorption percentage of the heavier desirable constituents is kept very high.

I have described a typical case where the warm oil is run into the absorption tower at about its middle. However, this warm oil may be run into the tower either higher up or lower down; and in some cases it may be preferred to inject it into the tower at one of the lower absorbing floors or sections; and it may be desirable to use less of the hot oil but to use it at a higher temperature, so that the mixture is still maintained at about the same temperature of about 100° F., mentioned hereinbefore. It will be understood, of course, that this temperature of the lower body of absorbing oil depends upon the liquids being absorbed and upon the character of the vapors and liquids desired to be eliminated from the final product.

And it is not necessary that the hot oil be all introduced at one point in the absorber. Typically the operation which I here describe depends upon the lower part of the absorbing oil body being hotter than the upper part; and this downward increase in temperature may be either attained by a single step up in temperature, as before explained, or may be attained by degrees. For instance, it may be most practicable for some purposes to introduce the hot oil in smaller portions, but in substantially the same aggregate amount, at distributed points along the height of the tower. For instance, the tower may be provided with a distribution pipe 36ª directly over the uppermost floor and others, as indicated in Fig. 4, may be spaced down through the height of the tower, and a proportionate amount of hot oil be put in at each of these distribution points or at any selected ones. Thus the temperature of the oil body as it flows down through the tower may be gradually raised, and the amount of step up in temperature between successive floors may be either uniform or non-uniform, as may be found most desirable and efficient.

In any usual absorption system where the fat oil is usually preheated, as by a preheater 9, and although the pressure maintained by pump 16 may be fairly high, a certain amount of vapor is generated and it may be desirable in any system to take that vapor off before the preheated oils are put into evaporator 18, where a still higher temperature is maintained. There is no object in putting the vapors themselves into the evaporator and their presence in the evaporator merely decreases the efficiency of its operation in heating the remaining liquid. In any system these vapors contain very largely the lightest undesirable constituents and their separation at that point and their return, as for instance through pipe 40, to the bottom of the absorption tower will in some instances further decrease the percentage of such very light vapors put through the evaporator and thus put into the final product which passes out from the evaporator through vapor line 41 to dephlegmator 42 and thence to condenser 43. In my system the use of such a separator, with the return of the separated lightest vapors to the bottom of the absorption tower, removes from the final product practically all the remaining parts of the lightest undesirable constituents. It will be understood that preheater 9 is usually run at such a temperature, say 320° F., that it will always evaporate all of these lightest constituents and usually some of the heavier ones. All these vapors, put back into the bottom or some intermediate section of the absorption tower, pass up through the tower along with the original gases and vapors, and again go through the absorption and stabilizing operation, the lightest vapors finally passing out with the dry gases, and the heavier vapors being reabsorbed.

In reintroducing the gases and vapors through line 40, to the absorption tower, in my system I find it best to introduce them at an intermediate point in the tower, preferably so that they will not come into contact with the hottest part of the oil body. I find that if these gases and vapors are introduced at the bottom of the tower, by coming into contact with the hottest oil, they substantially reduce the absorption capacity of that hot oil as regards the desirable absorbed constituents, and the recovery efficiency of the tower as a whole is thus kept down. By introducing the gases and vapors at an intermediate point, as at the point where the pipe 40 is shown coming into the absorber in Fig. 4, above the introduction of the warm oil, or above the hottest part of the absorbing oil body, the desirable features of reintroduction are attained and the absorbing action is kept up to its highest efficiency. The result is to clean the absorbing oil most completely of these lightest constituents before it passes to the evaporator, with the result that the final gasoline condensed at 43 is substantially entirely clean of the light undesirable fractions.

Such a vapor separator may consist of an apparatus as shown in Figs. 2 and 3. The vapor separator may comprise a shell 45 with a number of superposed annular pans 46 having perforated bottoms, the pans being preferably spaced from the separator shell and preferably having central openings 47 through which the vapors may rise upwardly. The heated oils from the preheater are introduced through pipe 19ª to a distributor 47ª in the uppermost pan. The oil flows out to form a layer, and showers down through the perforated bottom into the next pan, and so on until the oil finally reaches the bottom of the shell, where the body of oil is maintained constantly at 48 by the action of a float 49 controlling an oil outlet valve 50 in line 19ᵇ which goes to evaporator 18. The vapors are released from the oil during the showering and, passing to the upper part of the shell, go out through the vapor line 40 under control of valve 51 to the bottom or some intermediate section of the absorption tower. Valves 50 and 51 are both operated by float 49, the arrangement being such that as valve 50 is opened valve 51 is closed, and vice-versa. The valves illustrated are of the simple type that may open by depressing the valve stem 52; and it will be seen from the drawing that the lever 53 and connecting links 54 are so arranged and connected to float arm 55 that movement upwardly of float 49 will open valve 50 and will close valve 51. The purpose of this arrangement is to keep sufficient vapor pressure on the oils to force them into the evaporator and at the same time to release the gases and vapors as they are liberated from the oil. In practice the valve mechanism establishes a position of equilibrium in which both valves are somewhat open and sufficient pressure is at the same time maintained to force the oil out, the body of oil above outlet pipe 19ᵇ serving to prevent vapors passing out through that line.

Although it is preferable from some standpoints to utilize clean oil in the lower part of the absorption tower, fat oil can be used there and the system makes provision for using fat oil if desired. The general operation with fat oil is substantially the same as with lean oil; it is exactly the same as far as the refluxing and stabilizing operations are concerned, being only different in that the absorption action in the lower part of the tower is somewhat cut down due to use there of a certain amount of oil which is already more or less saturated with absorbed components.

It may be mentioned that should heated liquid, comprised of constituents within the volatility range of the vapors, be introduced to the lower part of the absorption tower, the interaction between the heated liquid and vapors would be fundamentally the same as in the described system wherein the absorbing liquid is of comparatively less volatility, that is, supposing the hot oil introduced through line 35 consisted in certain comparatively heavy fractions finally derived from the vapors, a certain amount of absorption of the heavier constituents of the upward flowing vapors would take place in the downward flowing oil, accompanied by vaporization of lighter fractions therein. Due to the comparative volatility of the lighter oil over the usual absorption oil, the operation would in its ultimate effect, be mainly one of rectification, although this rectification may be considered as occurring through the stabilizing of the absorption of the vapors in the lighter liquid, and which stabilization is efficiently carried out according to the present method.

I claim:

1. A method of stabilizing the absorption, in an absorbing liquid, of liquids having different vapor tensions, the operation of absorption consisting in passing vapor laden gases upwardly through a downwardly moving stream of absorbing liquid, then heating the laden absorbing liquid to vaporize off the absorbed liquids, and then cooling and returning the lean absorbing liquid to said stream; that includes maintaining the lower part of said absorbing stream at a temperature higher than that of the upper part by introducing into the lower part of said stream a certain amount of the heated absorbing liquid.

2. A method of absorbing and stabilizing liquids having different vapor tensions, that includes passing vapor laden gases upwardly through a downwardly moving stream of absorbing liquid, removing the laden absorbing liquid from the lower end of the stream and heating it to vaporize off its absorbed liquids, and maintaining the lower part of said absorbing liquid stream at a higher temperature than the upper part by introducing into said lower part a portion of the heated absorbing liquid.

3. A method of absorbing and stabilizing liquids having different vapor tensions, that includes passing vapor laden gases upwardly through a downwardly moving stream of absorbing liquid, removing the laden absorbing liquid from the lower end of the stream and heating it to vaporize off its absorbed liquids, separating the vapors of the absorbed liquid from the absorbing liquid, cooling the absorbing liquid and returning it to said stream and maintaining the lower part of said stream at a higher temperature than the upper part by introducing into the lower part of said stream a portion of the heated lean absorbing liquid as it comes from the vaporizing and separating operation.

4. Apparatus for the method herein described, comprising an absorption tower having means for introducing a lean absorbing liquid at its upper end and vapor laden gas at its lower end, means for taking off dry gas at its upper end and laden absorbing liquid at its lower end, means for heating the laden absorbing liquid to evaporate therefrom the absorbed liquids, means to cool the lean absorbing liquid resulting from said evaporation and to return it to the upper end of the absorption tower, and means for introducing a portion of the heated absorbing liquid to an intermediate point in the absorption tower.

5. Apparatus for the method herein described, comprising an absorption tower having means for introducing a lean absorbing liquid at its upper end and vapor laden gas at its lower end, means for taking off dry gas at its upper end and laden absorbing liquid at its lower end, evaporating means for heating the laden absorbing liquid to evaporate therefrom the absorbed liquids, means to cool the lean absorbing liquid resulting from said evaporation and to return it to the upper end of the absorption tower, means for taking off a portion of the lean absorbing liquid as it comes heated from the evaporation means and introducing said portion to an intermediate point in the absorption tower.

6. Apparatus for the method herein described, comprising an absorption tower having means for introducing a lean absorbing liquid at its upper end and vapor laden gas at its lower end, means for taking off dry gas at its upper end and laden absorbing liquid at its lower end, means for heating the laden absorbing liquid to a temperature sufficient to vaporize off the more volatile of its absorbed liquids, means for separating the vapors produced by said heating and return them to an intermediate point of the absorption tower, and means for introducing a portion of the heated absorbing liquid to an intermediate point in the absorption tower.

7. The method of stabilizing the absorption, in an absorbing liquid, of liquid having different vapor tensions, the operation of absorption consisting in passing vapor laden gases upwardly through a downwardly moving stream of absorbing liquid, that includes supplying heat from an extraneous source to the downwardly moving liquid at an intermediate point in said stream and above the point of gas introduction thereto, whereby the lower part of said gas contacting liquid stream is maintained at a temperature higher than that of the upper part of said stream with a relatively abrupt change in temperature at the point of heat introducion.

8. The method of absorbing and stabilizing liquids having different vapor tensions, that include passing vapor laden gases upwardly through a downwardly moving stream of absorbing liquid, supplying heat from an extraneous source to the downwardly moving liquid at an intermediate point in said stream above the point of gas introduction thereto, whereby the lower part of said gas contacting liquid stream is maintained at a temperature higher than that of the upper part of said stream with a relatively abrupt change in temperature at the point of heat introduction.

9. The method of absorbing and stabilizing liquids having different vapor tensions, that includes passing vapor laden gases upwardly through a downwardly moving stream of absorbing liquid, supplying heat from an extraneous source to the lower portion of said downwardly moving stream above the point of gas introduction thereto, whereby the lower portion of the stream is maintained at a comparatively higher temperature than the upper part.

10. The method of absorbing and stabilizing liquids having different vapor tensions, that includes passing vapor laden gases upwardly through a downwardly moving stream of absorbing liquid, maintaining the lower portion of said downwardly moving stream above the point of gas introduction thereto, at a comparatively higher temperature than the upper portion of the stream, and with a relatively abrupt change in temperature at the upper and lower ends of said lower and upper portions, respectively, of the stream.

In witness that I claim the foregoing I have hereunto subscribed my name this 29 day of March, 1927.

JULIAN A. CAMPBELL.